United States Patent [19]

Moses et al.

[11] 4,433,212
[45] Feb. 21, 1984

[54] TELEPHONE LINE INTERFACE CIRCUIT

[75] Inventors: Donald W. Moses, Minneapolis, Minn.; Charles Hustig, Hudson, Wis.; C. Ray Ballard, Venice, Fla.

[73] Assignee: Applied Spectrum Technologies, Inc., Minneapolis, Minn.

[21] Appl. No.: 390,183

[22] Filed: Jun. 21, 1982

[51] Int. Cl.³ .......................................... H04M 11/00
[52] U.S. Cl. ...................... 179/2 C; 179/2 DP
[58] Field of Search .................. 179/2 C, 1 C, 2 DP, 179/2 A, 3, 4, 1 D, 186, 16 AA, 18 FA, 175.2 R, 179.2 C

[56]  References Cited
U.S. PATENT DOCUMENTS

| | | | |
|---|---|---|---|
| 4,203,006 | 5/1980 | Mascia | 179/2 C |
| 4,224,478 | 9/1980 | Fahey et al. | 179/18 FA |
| 4,321,429 | 3/1982 | Takatsuki et al. | 179/2 DP |
| 4,378,470 | 3/1983 | Murto et al. | 179/2 C |

*Primary Examiner*—A. D. Pellinen
*Assistant Examiner*—W. J. Brady
*Attorney, Agent, or Firm*—Dorsey & Whitney

[57] ABSTRACT

A circuit for coupling digital or analog data signals to a telephone line. A direct coupled transistorized circuit is disclosed having three different impedance conditions: on-hook, off-hook, and loop-test. Consequently, data can be transmitted regardless of the on-hook or off-hook status of the associated telephone sets and regardless of whether or not the telephone sets are in use. In addition, data transmission can range over a frequency spectrum of approximately d-c to frequencies in the data-over-voice range. Because of the variable bridging impedance, the drive impedance is not too low during on-hook ringing and the circuit need not be disconnected during ringing or testing.

15 Claims, 2 Drawing Figures

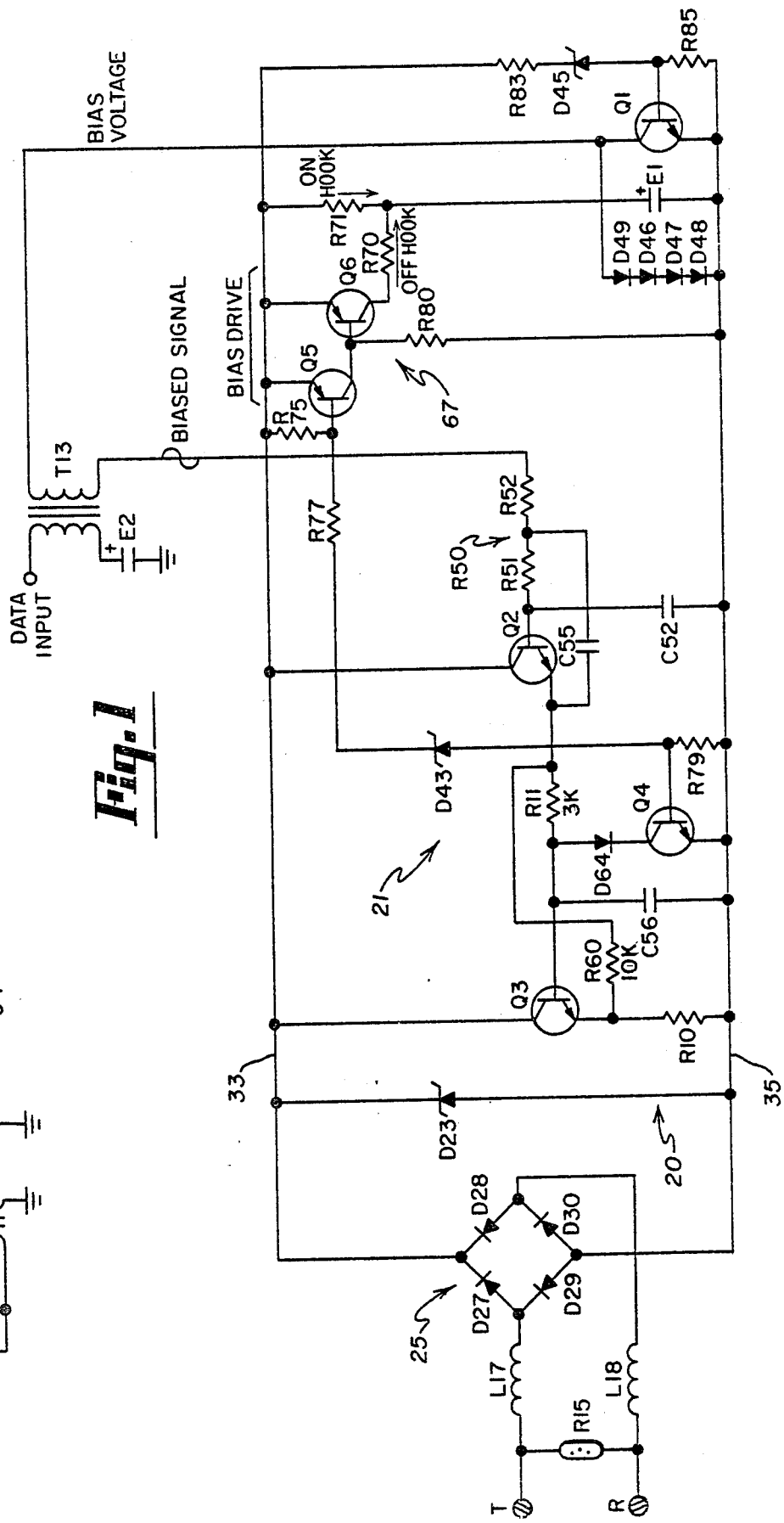
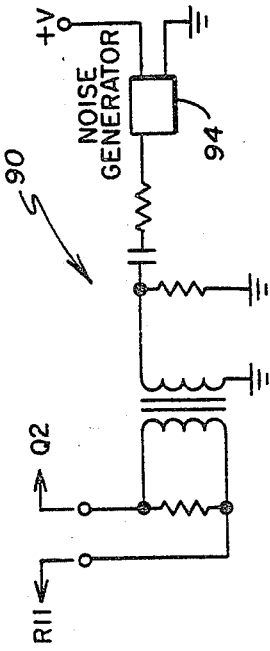

TELEPHONE LINE INTERFACE CIRCUIT

BACKGROUND OF THE INVENTION

The present invention relates to data transmission circuits and more particularly to a communications medium coupling circuit for continuous coupling of data to a standard telephone line.

Conventional capacitor coupled circuits have an inadequate low frequency response to couple low frequencies onto a telephone line such as those that exist in data-under-voice frequency signals or in certain spread spectrum frequency transmissions.

Conventional transformer coupled circuits generally have a d-c impedance that is too low if not put in series with a d-c blocking capacitor. The capacitor is required to provide a high d-c impedance so that when, for example, a test voltage is applied to the telephone pair, a hundred and fifty volts d-c across tip and ring, the coupling circuit reacts more like an open circuit than a low impedance.

However, when data transmissions are desired which are below voice frequencies the d-c blocking capacitor must be very large and becomes expensive. If the capacitor gets large, however, then its a-c impedance at normal ringing frequencies of about twenty hertz, provides too low an impedance to the ringing current.

Other conventional transistorized coupling circuits in use with telephone sets or for TOUCH-TONE dialers, have a drive impedance that is too low for on-hook ringing conditions and therefore conventionally exist on the equipment side of a switch hook so that during ringing conditions and during testing situations, the coupling circuit is disconnected from the line by the switch hook so that it only has to provide a line matching impedance when the equipment is off-hook.

Consequently, these conventional circuits do not provide an interface circuit which can remain connected to the telephone line at all times for both on-hook and off-hook data transmissions and which can successfully transmit a wide range of frequency signals, including low frequency data signals.

Two transistorized circuits have been devised which can remain connected to the line, one of which is controlled by a microprocessor, the other of which uses a modem attached to the circuit for control. In each, the data transmission is coupled via a coupling transformer and at least one d-c blocking capacitor. Consequently, neither transistorized circuit is suitable for transmission of low frequency data. In addition, each is designed for transmission in only one condition of the telephone line, on-hook or off-hook.

In U.S. Pat. No. 4,203,006 three basic circuit means are used, each controlled by an associated modem which causes data to be transmitted only when the telephone line is in the off-hook condition. A first circuit means detects a ring signal. This is connected to the modem which causes a signal to be generated to indicate that the telephone is off-hook. When the signal is generated to produce an off-hook condition on the telephone line the off-hook current is diverted around a coupling transformer and the modem then sends or receives a-c signals coupled to the telephone line with the use of a coupling transformer and associated blocking capacitor.

In U.S. Pat. No. 4,224,478 a microprocessor controlled coupling circuit is disclosed. The microprocessor periodically pulses the circuit to determine whether or not an associated telephone set is off-hook. When off-hook, data cannot be transmitted. When on-hook the microprocessor is enabled to transmit or receive data, again, coupled to the telephone line with an isolation transformer in series with at least one d-c blocking capacitor.

Consequently, the coupling circuits of both of these inventions enable the transmission of frequency data in a limited frequency range and then only in one operating condition of the telephone line.

These prior coupling circuits are voltage mode devices. Data signals transmitted are superimposed onto whatever d-c voltage is on the line.

SUMMARY OF THE INVENTION

The current invention is a unique, inexpensive circuit design which enables the continuous transmission of data over the telephone line whether or not the associated telephone sets are on-hook, off-hook, in use or during ringing and testing. It remains connected to the line at all times and does not require any additional microprocessor or modem control device during or for operation.

The circuit of the present invention has three bridging impedance conditions; when the telephone is on-hook, when the telephone is off-hook, and during the loop-test condition.

The circuit operates to vary the loop current in the line. Therefore, whatever current is flowing, whether it is zero current during the on-hook condition or approximately twenty milliamps during the off-hook condition, the circuit adds to that current flow an incremental amount.

The circuit of the present invention also has three basic operating states. When the telephone is on-hook a first transistor becomes the output driver. Because of the circuit configuration associated with the first output driver an average on-hook current sink of approximately 0.5 milliamp with a 0.25 milliamp peak-to-peak a-c signal results, yielding an average bridging impedance of over one hundred kilohms. This is too high an impedance to interfere with normal ringing operation and the like.

During the off-hook condition a second transistor becomes the output driver. The circuit configuration associated with the second output driver results in a total average sink current of 2.7 milliamps. This causes an average bridging impedance during the off-hook condition of less than two kilohms.

During the loop-test condition a third transistor causes the driver transistors to be turned off. The bridging impedance in this condition is then greater than two hundred kilohms.

The resulting transistorized circuit is a circuit which stays across the line under all operating conditions. It functions to transmit data on the telephone line during either the on-hook or off-hook condition, when the telephone is in use and when it is not, and interfaces digital or analog data signals which can have a frequency response of approximately d-c to frequencies in the data-over-voice range.

Other features and objects of the invention will become apparent to those skilled in the art when reviewing the Description of the Preferred Embodiment in conjunction with the associated drawing.

DESCRIPTION OF THE DRAWINGS

FIG. 1 is a schematic diagram of our invention;
FIG. 2 is a schematic diagram of an optional circuit which can be inserted in the circuit of FIG. 1.

DESCRIPTION OF THE PREFERRED EMBODIMENT

The interface circuit shown in FIG. 1 is suitable for the continuous transmission of digital or analog data over a wide frequency range that can be continuous whether the phone is on-hook, off-hook, in use, and during ringing or testing. The circuit provides a means and method of coupling signals onto the line when the telephone is off-hook whether or not the telephone is in use. Data can continue to be transmitted when the telephone is used for making and receiving normal telephone calls. Data continues to be transmitted when the telephone is on-hook after the parties hang-up.

In the event that a high voltage is applied to the line to test for shorts and grounds, the circuit operates to provide a very high impedance.

The circuit uses a current mode method of putting information on the line. The circuit operation varies the loop current in the line. Therefore, whatever current is flowing, whether it is zero current in an on-hook condition or approximately twenty milliamps in an off-hook condition, the circuit adds to that current flow an incremental current representative of the data coupled to the line.

To achieve a self-regulating effect, that is to enable the circuit to appropriately respond to all conditions of the telephone line, the circuit configuration is such that the output stage, 20 or 21, of the circuit is different for the on-hook and the off-hook condition. In the test condition, both output stages, 20 and 21, are turned off to maximize the output impedance.

In the off-hook condition, a first transistor Q3 is the driver for the output stage 20 and current is determined by the voltage across an hundred ohm resistor R10. The voltage varies from zero to half a volt so that the average current through the resistor R10 is two and one-half milliamps with a peak-to-peak current of five milliamps. Other currents generated by the circuit increase the average current to 2.7 milliamps.

When the telephones attached to the line are on-hook the objective is to draw less current. This is achieved by turning off transistor Q3 with transistor Q4, as will be explained in more detail below, and the same a-c voltage is applied across a three kilohm resistor R11. This reduces the average current to approximately 0.5 milliamp which is not enough current to make the circuit look like it is off-hook. Again, the current flow in the loop is modulated by the data signal across the isolation transformer T13.

When test voltage is applied to the line, a transistor switch Q1 removes the bias voltage for the output stages, 20 and 21. This turns off both output stages, 20 and 21, creates a very high bridging impedance and no information is transmitted during the time that the line is in a test condition. The only circuit loop current that flows is current that is required by the bias switching transistor.

Consequently, the circuit is one that can stay across the line at all times. It does not require a switch hook to remove the circuit from the line and it is capable of sending continuous information in both of the two most common operating conditions of the telephone line, on-hook and off-hook.

These functions are achieved as follows.

The d-c voltages on the line are generally fifty volts during an on-hook condition, five volts when one phone is off-hook, three and a half volts when two phones are off-hook and one hundred fifty volts when the line is being tested for shorts and grounds.

A much higher voltage may be applied to the line in the event of lightning strike or the like. For lightning protection an MOV variable resistor R15 is used that has a very low impedance at voltages above one hundred eighty-five volts and a very high impedance at voltages below one hundred eighty-five volts so that it tends to short out lightning transmissions. As shown in the drawing two small RF inductive chokes L17, L18 in series with the line may also be used in order to slow down transients that may come in during surges and to accommodate the turn-on characteristics of a protection zener diode D23 (or a second MOV variable resistor) also utilized to help in lightning protection.

When standard d-c voltages are applied to the line, they can be of either polarity. Consequently, a full-wave rectifier 25, consisting of four diodes, D27–D30, is used, configured to create the most positive voltage on the top rail 33 and a floating ground on the bottom rail 35 as shown in the drawing.

The operating state of the circuit is determined by the operating condition of the telephone line. Two zener diodes, D43 and D45, are used to change the operating state of the circuit.

A first two hundred volt zener diode D23 is connected across the full-wave rectifier 25 for circuit protection, again in the event of lightning strike or the like. A second twelve volt zener diode D43 is connected in the circuit to change the circuit state from an off-hook to an on-hook condition when the voltage across tip T and ring R approaches fifty volts, indicating an on-hook condition of the telephone line. A third sixty-two volt zener diode D45 is connected to a transistor switch Q1 to turn off both output stages 20, 21 when the voltage across tip T and ring R approaches one hundred fifty volts indicating that the telephone company is testing the line for grounds or shorts.

In the off-hook condition the voltage between tip T and ring R will be approximately five volts with one phone off-hook and approximately three and a half volts with two phones off-hook which causes transistor Q4 to be nonconducting. The output stage 20 or driver in the off-hook condition includes a transistor Q3 which is connected as a constant current device, the current through which is determined by the emitter to floating ground voltage across the resistor R10 connected to the emitter of transistor Q3, which is preferably one hundred ohms. Since the voltage applied to the collector of transistor Q3 can be as high as one hundred fifty volts during line test, or higher, transistor Q3 is preferably a high voltage transistor, approximately three hundred volts, to take the collector to emitter voltage.

The 0.25 volt d-c average voltage across R10 causes an average sink current of two and a half milliamps with a five milliamp peak-to-peak a-c signal level. This sink current plus the bias driver Q6 current results in a total average sink current of 2.7 milliamps. This causes an average impedance of 5v d-c/2.7ma=1.9 kilohms.

Data to be connected to the output stage 20 is connected from the secondary winding of the isolation transformer T13, which can be a Philmore Isolation Transformer, model designation ST-21. The signal is biased by the forward drop across four diodes D46–D49. The biased a-c signal is applied to the base of transistor Q2 which operates as an emitter follower where the emitter has the same a-c signal, only dropped down by the base-emitter junction voltage, about half a volt less than the voltage applied to the base. Transistor Q2 therefore acts as a current amplifier and driver for transistor Q3. The data signal from transistor Q2 is applied through a series connected resistor R11 to the base of Q3 which is the output stage 20.

The base resistor R50 of transistor Q2 is divided into two components R51, R52 and is configured as a Sallen Key Low Pass Filter. In this configuration the base of the transistor Q2 is tied to ground 35 with a capacitance C52 that is roughly one-fourth the capacitance of the feed-back capacitor C55 that is connected from the midpoint of the base resistor R50. The filter removes high frequency harmonics generated in the transformer. A second low pass filtering stage consisting of resistor R11 and capacitor C56 to ground 35 assists in eliminating high frequency noise and harmonics.

An additional bridging resistor R60 is used to provide a d-c conduction path to floating ground to improve linearity of the circuit. The positive feedback creates a high a-c impedance, higher than the value of R60. For data-under-voice transmissions the filter capacitors C52, C55 and C56 should produce a cut-off frequency around one hundred Hertz to take out any distortion or harmonic distortion products that may fall within the voice band. If data is being transmitted within the voice band, such as when using spread spectrum techniques, the capacitors C52, C55, C56 should be chosen to have a cut-off frequency around three kilohertz to prevent signals on the telephone line above the voice band.

When the telephones are all on-hook, the voltage between tip T and ring R will be nominally fifty volts d-c. This will cause current to flow through the twelve volt zener D43 which turns on transistor Q4. Transistor Q4 enables transistor Q2 and takes the base of transistor Q3 down to the point where transistor Q3 is no longer turned on, making Q2 the output driver and its emitter resistor R11 the current source. Transistor Q2 is also preferably a high voltage three hundred volt transistor to take the collector to emitter voltage which might be applied across tip T and ring R. Basically, the circuit condition is essentially the same as in the off-hook condition except that the higher resistance value of R11, now the emitter resistor for transistor Q2, determines the current through the transistor Q2.

The diode D64 in series with the collector of transistor Q4 provides one silicon junction voltage drop equal to the base-emitter drop of transistor Q3 when transistor Q4 is turned off. This causes the voltage across R11 to be 0.25 volts d-c with an 0.5 volt peak-to-peak a-c signal level.

Using a three kilohm resistor for R11 provides a sufficiently high impedance for the second transistorized output stage 21 so as not to interfere with normal ringing operation. This generates an on-hook, average d-c current sink of approximately 0.1 milliamps with a 0.2 milliamp peak-to-peak a-c signal level, plus additional steady-state current as required to operate the bias voltage generator Q5 and to turn on transistor Q4. The result is an average on-hook current sink of 0.5 milliamp with a 0.2 milliamp peak-to-peak a-c signal, yielding an average bridging impedance of over one hundred kilohms. When a three kilohm resistor is used, it is preferred that the value of R60 be ten kilohms.

The bias applied to the base of transistor Q2 is fairly critical since it is desired to have as low an average current flow through the transistors Q2, Q3 as possible. Therefore, the base should be biased as close as possible to the floating ground 35 and yet not create clipping with the modulation of voltage. This is achieved with a bias voltage generator which uses the forward drop across four diodes D45–D48 to generate the bias voltage. Since the forward drop across the diodes D45–D48 is a function of the current through the diodes D45–D48, they have a strong regulating effect. The current through the diodes is determined by a two transistor switch circuit 67 using PNP transistors Q5, Q6.

In the off-hook condition, the transistor Q6 on the right will be on and the transistor Q5 on the left will be off. A low voltage will exist on the top rail 33 and the off-hook bias current flows through a low value resistance R70 on the order of ten kilohms.

When the line condition goes to the on-hook condition the twelve volt zener D43 will fire creating base current in the bias drive transistor Q5 on the left. When that transistor Q5 turns on it will take the base of the driver transistor Q6 on the right very close to the voltage of the top rail 33 thus turning off the transistor Q6 on the right. This causes the bias current to be generated through R71 which is preferably approximately eight hundred twenty kilohms.

When the telephone line is being tested by applying a test voltage of approximately one hundred fifty volts to the line, the sixty-two volt zener D45 will fire. When it conducts it turns on transistor Q1 which pulls the bias voltage down to approximately the floating ground 35. This turns off both drive transistors, Q2 and Q3, to produce a very high impedance across the line, well over one hundred kilohms.

The conduction paths for test current in the test condition of the line include from the top rail 33 through the biasing resistor R75 and base resistor R77 for transistor Q5, through diode D43 and through the base resistor R79 of transistor Q4 to the floating ground 35; through bias drive transistor Q5 and the base resistor R80 of transistor Q6 to ground 35; through the on-hook current source resistor R71 and through the bias switching transistor Q1 to ground 35; and through resistor R83, diode D45 and resistor R85 to ground 35. These component values can be selected to yield an effective bridging impedance of approximately two hundred kilohms.

Similarly, if the ringing signal exceeds sixty-two volts both output stages 20, 21 will be temporarily shut down for the duration of the ringing signal and sufficient impedance will be presented to line so that the circuit will not trip the ringing signal.

FIG. 2 is an optional insert 90 which can be connected between the emitter of transistor Q2 and resistor R11. The optional insert is an IC chip 94 which is a noise generator which can be used to add a little background noise on the line to confirm that the circuit is sending information. It is also possible to use the insert 90 when information is being transmitted within the voice band. In those situations where the transmission of data causes ringing, whistling, swishing or other uncharacteristic sounds, such sounds can be masked by white noise from the optional noise generator 90. It should be understood that the white noise being transmitted will be at a very low level, usually not any higher than the normal white noise which exists on a telephone line. In these situations the purpose of the noise generator 90 is to make sure that there is a quiescent noise level in the background to blend in with in case the line that data is being transmitted on is too quiet. When the noise generator circuit 90 is used, filter capacitor C56 should not be used.

Those skilled in the art will realize that other semiconductor devices and other variations of the circuit configuration can be used other than those specifically disclosed herein without departing from the spirit of the invention. It should be understood that any such modifications and variations that may be resorted to are considered to be within the purview and scope of the present invention and it is intended by the appended claims to cover all such variations and modifications as fall within the spirit and scope of the invention.

We claim as our invention:

1. A communications medium interface circuit which couples data to a telephone line having at least one telephone connected thereto during all normal operating conditions of the line comprising:
   a first transistorized output state connected to the telephone line having a low bridging impedance operative when the associated telephone connected to the telephone line is off-hook;
   a second transistorized output stage connected to the telephone line having a high bridging impedance operative when the associated telephone connected to the telephone line is on-hook; and
   means connected to the telephone line and operatively connected to each of the output stages for sensing when the associated telephone is on-hook or off-hook and for switching the circuit between the first output stage and the second output stage in response to the condition of the telephone line such that data is operably coupled to the telephone line by the first stage when the telephone is off-hook and the data is operably coupled to the telephone line by the second stage when the telephone is on-hook.

2. The communications medium interface circuit of claim 1 wherein data is coupled to the telephone line through the first output stage when one or more telephones connected to the telephone line are off-hook and wherein data is coupled to the telephone line through the second output stage when all telephones connected to the telephone line are on-hook.

3. The communications medium interface circuit of claim 1 wherein each of the output stages includes a drive transistor, the circuit further comprising:
   means operably coupled to the line for detecting when a test voltage is applied to the telephone line; and
   means operably coupling said detecting means and said output stages for turning off the first output stage transistor and the second output stage transistor when a test voltage is applied to the telephone line so that the bridging impedance of the circuit is very high when the line is being tested.

4. The communications medium interface circuit of claim 1 wherein the bridging impedance of the first transistorized output stage is approximately two kilohms when one or more telephones connected to the line are off-hook.

5. The communications medium interface circuit of claim 1 wherein the bridging impedance of the second output stage is greater than one hundred kilohms when telephones connected to the telephone lines are on-hook.

6. The communications medium interface circuit of claim 3 wherein the bridging impedance of the circuit is greater than a hundred kilohms when a test voltage is applied to the telephone line.

7. The communications medium interface circuit of claim 1 wherein the output of the first transistorized output stage and the output of the second transistorized output stage varies current in the telephone loop to transmit data on the telephone line.

8. The communications medium interface circuit of claim 1 further comprising means for protecting the circuit from very high voltages.

9. The communications medium interface circuit of claim 8 wherein the line includes tip and ring terminals and the means for protecting the circuit against very high voltages comprises:
   a variable resistor operably connected across the tip and ring terminals having a high impedance to low voltages and a low impedance to very high voltages;
   at least one inductive choke in series with the tip and ring terminals of the telephone line; and
   a zener diode or a second variable resistor operably connected across the tip and ring terminals of the telephone line.

10. The communications medium interface circuit of claim 1 wherein the data is transformer coupled to the circuit at its input using an isolation transformer and wherein the secondary winding of the isolation transformer is directly coupled to the first output stage and to the second output stage so that the communications medium interface circuit can connect a wide range of frequencies to the telephone line, said frequencies ranging from approximately direct current frequencies to frequencies in the data-over-voice range.

11. The communications medium interface circuit of claim 1 wherein the circuit further comprises:
   means for biasing the signal to drive the first output stage and the second output stage and wherein the current drawn by the biasing means is within an order of magnitude regardless of the condition of the telephone line.

12. The communications medium interface circuit of claim 1 further comprising:
   means for filtering the data signal to filter out frequencies above the range of frequency of the data.

13. The communications medium interface circuit of claim 12 wherein the filtering means has a cut-off frequency of approximately one hundred Hertz.

14. The communications medium interface circuit of claim 12 wherein the filtering means has a cut-off frequency of approximately three kilohertz.

15. The communications medium interface circuit of claim 1 further comprising:
   means for generating noise connected to the first output stage so that a low white background noise is generated on the line when one or more of the telephones connected to the telephone line are off-hook.

* * * * *